(12) United States Patent
Stout

(10) Patent No.: US 7,997,592 B2
(45) Date of Patent: Aug. 16, 2011

(54) GURNEY CLAMP, DETACHABLE EQUIPMENT STAND AND ASSOCIATED TRANSPORT CART

(76) Inventor: Darren Stout, Fullerton, CA (US)

( * ) Notice: Subject to any disclaimer, the term of this patent is extended or adjusted under 35 U.S.C. 154(b) by 1019 days.

(21) Appl. No.: 11/475,817

(22) Filed: Jun. 26, 2006

(65) Prior Publication Data

US 2007/0296165 A1 Dec. 27, 2007

(51) Int. Cl.
*B62B 1/00* (2006.01)
(52) U.S. Cl. ............... 280/47.19; 280/47.24; 280/47.18
(58) Field of Classification Search ............... 280/47.18, 280/47.17, 1.188, 47.28, 638, 47.131, 47.34, 280/63, 47.19, 47.24, 47.35, 641, 79.11; 408/115 R, 103, 97; 5/600, 503.1
See application file for complete search history.

(56) References Cited

U.S. PATENT DOCUMENTS

| | | | | |
|---|---|---|---|---|
| 2,533,541 A * | 12/1950 | Warring | ...................... | 280/47.19 |
| 3,116,936 A * | 1/1964 | Magarian | ...................... | 280/47.19 |
| 3,894,748 A * | 7/1975 | Ratcliff | ......................... | 280/641 |
| 5,135,191 A * | 8/1992 | Schmuhl | ...................... | 248/125.1 |
| 5,319,816 A | 6/1994 | Ruehl | ............................... | 5/600 |
| 5,355,539 A * | 10/1994 | Boettger | ......................... | 5/503.1 |
| 5,409,329 A * | 4/1995 | Juang | ........................ | 408/115 R |
| 6,260,865 B1 * | 7/2001 | Yacobi et al. | ............... | 280/47.34 |
| 7,065,812 B2 * | 6/2006 | Newkirk et al. | .................. | 5/600 |
| 7,147,412 B2 * | 12/2006 | Davis | ........................ | 408/115 R |
| 2004/0182977 A1 | 9/2004 | Weiss | | |
| 2006/0242763 A1 * | 11/2006 | Graham et al. | ................ | 5/503.1 |
| 2008/0217910 A1 * | 9/2008 | Walke et al. | ............... | 285/121.7 |

* cited by examiner

*Primary Examiner* — Hau V Phan
(74) *Attorney, Agent, or Firm* — Steins & Associates, P.C.

(57) ABSTRACT

A Gurney Clamp, Detachable Equipment Stand and Associated Transport Cart is disclosed. The combination of these devices makes the transportation of patients and health status monitoring equipment more controlled, reliable and safe. The clamp is specifically configured to be attachable to the safety rails on a conventional gurney. Once installed, the clamp will provide a secure mounting point to attach the detachable equipment stand to the gurney. The stand is configured to be capable of holding a wide variety of patient monitoring equipment in an upright manner so that the equipment data can be easily viewed. The stand can be quickly and easily shifted back and forth between its mounting location at the gurney clamp, and its mounting location on the associated transport cart. When the stand is attached to the equipment cart, it provides the equipment with a secure, portable storage location.

10 Claims, 6 Drawing Sheets

GURNEY CLAMP, DETACHABLE EQUIPMENT STAND AND ASSOCIATED TRANSPORT CART

BACKGROUND OF THE INVENTION

1. Field of the Invention

This invention relates generally to medical equipment and, more specifically, to a Gurney Clamp, Detachable Equipment Stand and Associated Transport Cart.

2. Description of Related Art

Portable medical equipment for monitoring and/or treating a patient is used daily by emergency medical personnel in ambulances, but also in the hospital environment. It is not uncommon for a patient to be transferred from an ambulance to a hospital emergency room, all the while having electronic monitors and related equipment connected to the patient. As the equipment manufacturers have added more and more capabilities to these portable units, the units not only have become more necessary, but also have become more unwieldy as well as more expensive. As a result, the cost of damaged equipment has escalated, while at the same time the risk of doing damage to the equipment has increased.

The current approach for transporting the portable equipment used by health care providers is to place the monitor on the patient's gurney during transport, and then onto the floor or other surface that is in close proximity to the patient's bed. The problem with this is that the equipment can tend to be heavy and difficult to manage. There usually are cables, wires and/or tubes running between the equipment and the patient. Furthermore, the equipment is design to rest on a flat surface, and is usually not equipped with any sort of straps or clips to aid in securing the equipment in place.

One particular drawback of the prior approach is that it does not allow a patient to be transferred from a bed to a gurney without disconnecting and then reconnecting the monitoring equipment.

What is needed, then, is a system and assembly that provides a convenient, stable location for portable medical equipment to be transferred from a vehicle to a gurney and back again securely and without risk to the patient or the equipment. Furthermore, the system and assembly should permit the patient to be transferred while the equipment remains mounted and safely secured.

SUMMARY OF THE INVENTION

In light of the aforementioned problems associated with the prior devices assemblies, it is an object of the present invention to provide a Gurney Clamp, Detachable Equipment Stand and Associated Transport Cart. The combination of all of these devices should make the transportation of patients and health status monitoring equipment more controlled, reliable and safe. The clamp should be configured to be attachable to the safety rails on a conventional gurney. Once installed, the clamp should provide a secure mounting point to attach the detachable equipment stand to the gurney. The stand should be configured to be capable of holding a wide variety of patient monitoring equipment in an upright manner so that the equipment data can be easily viewed. The stand should be designed such that it can be quickly and easily shifted back and forth between its mounting location at the gurney clamp, and its mounting location on the associated transport cart. When the stand is attached to the equipment cart, it should provide the equipment with a secure, portable storage location.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a Gurney Clamp, Detachable Equipment Stand and Associated Transport Cart.

Figure 1:
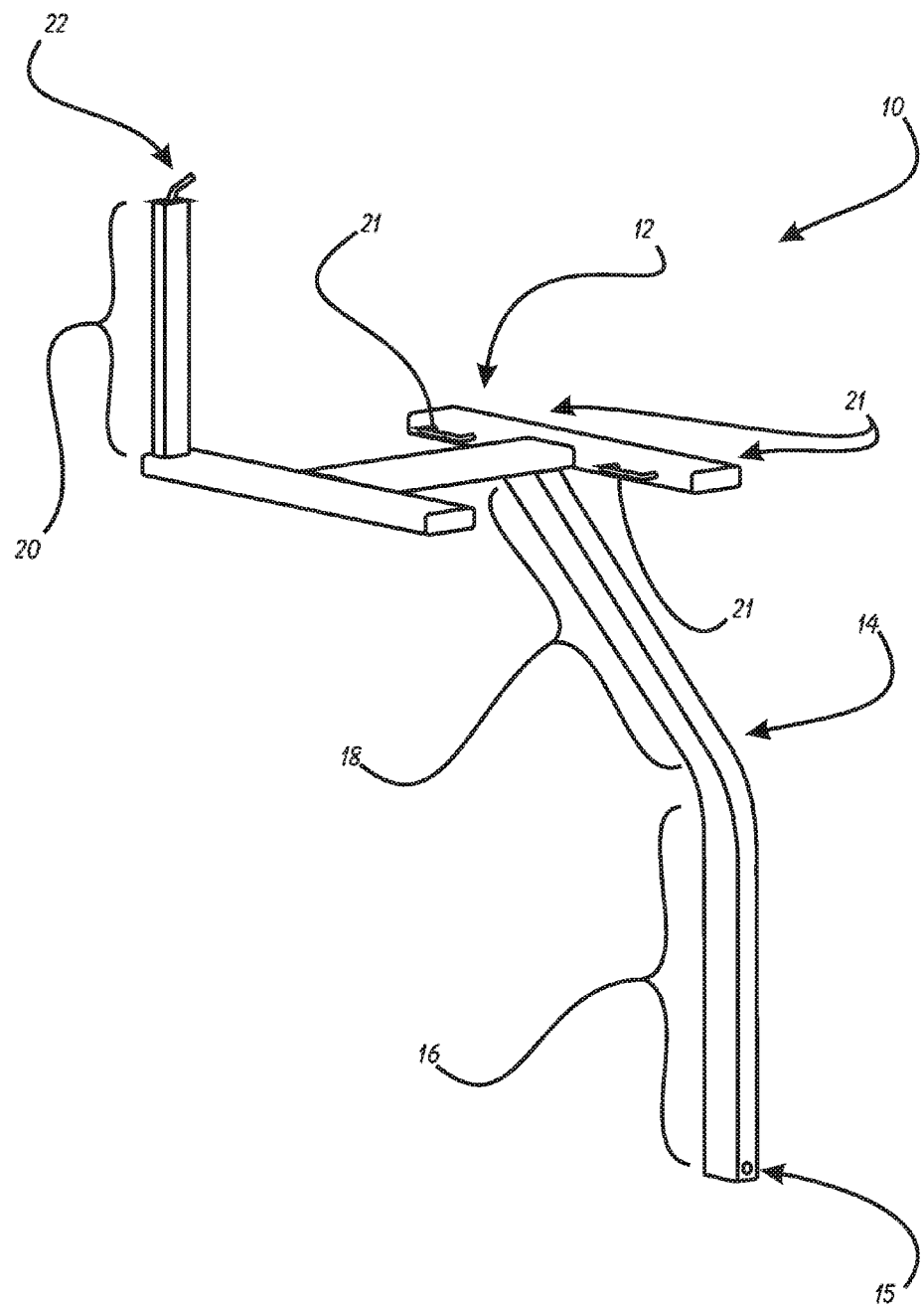
FIG. 1 is a perspective view of a preferred embodiment of the detachable equipment stand of the present invention.

The present invention can best be understood by initial consideration of FIG. 1. FIG. 1 is a perspective view of a preferred embodiment of the detachable equipment stand 10 of the present invention. The stand 10 is preferably made from rectangular aluminum tube in order to ensure maximum strength and durability, but also being lightweight.

The stand 10 has an H-frame flat base 12 for convenient placement of a piece of portable equipment. An upright arm 14 extends downwardly from the base 12, and is formed from two interconnected sections: a vertical section 16 at the bottom end of the arm 14, and an angled section 18, into which the vertical section 16 transitions at a point somewhere between the bottom end of the arm 14 and the attachment point to the base 12. The arm 14 further has a pair of retaining apertures 15 formed through the distal end of the vertical section 16 proximate to the end of the section 16. These apertures 15 will be described more fully below in connection with the discussion related to the gurney clamp.

A cord strut 20 extends upwardly from the base 12, and terminates in a finger hook 22. The cord strut 20 provides a convenient location to mount additional auxiliary equipment associated with the piece of equipment that is being carried by the base 12. The strut 20 and finger hook 22 design depicted here is for holding an IV pump and bag of fluid.

The H-frame shape of the base 12 is specifically configured as such to provide ample support for the piece of portable equipment, while also giving plenty of structural locations for strapping the equipment to the base 12. It is believed that the structure shown is superior to a solid flat platform or a perimeter frame configuration.

A further aspect of the stand 10 is the provision of a plurality of tie-down loops 21 protruding from a variety of locations on the stand 10. Here, there are four loops 21 extending from the H-frame base 12. Other loops 21 may further be provided at alternate locations on the stand 10 in order to strap the monitoring equipment (and other items) securely to the stand 10. If we now turn to FIG. 2, we can examine the second component of the assembly of the present invention.

Figure 2:
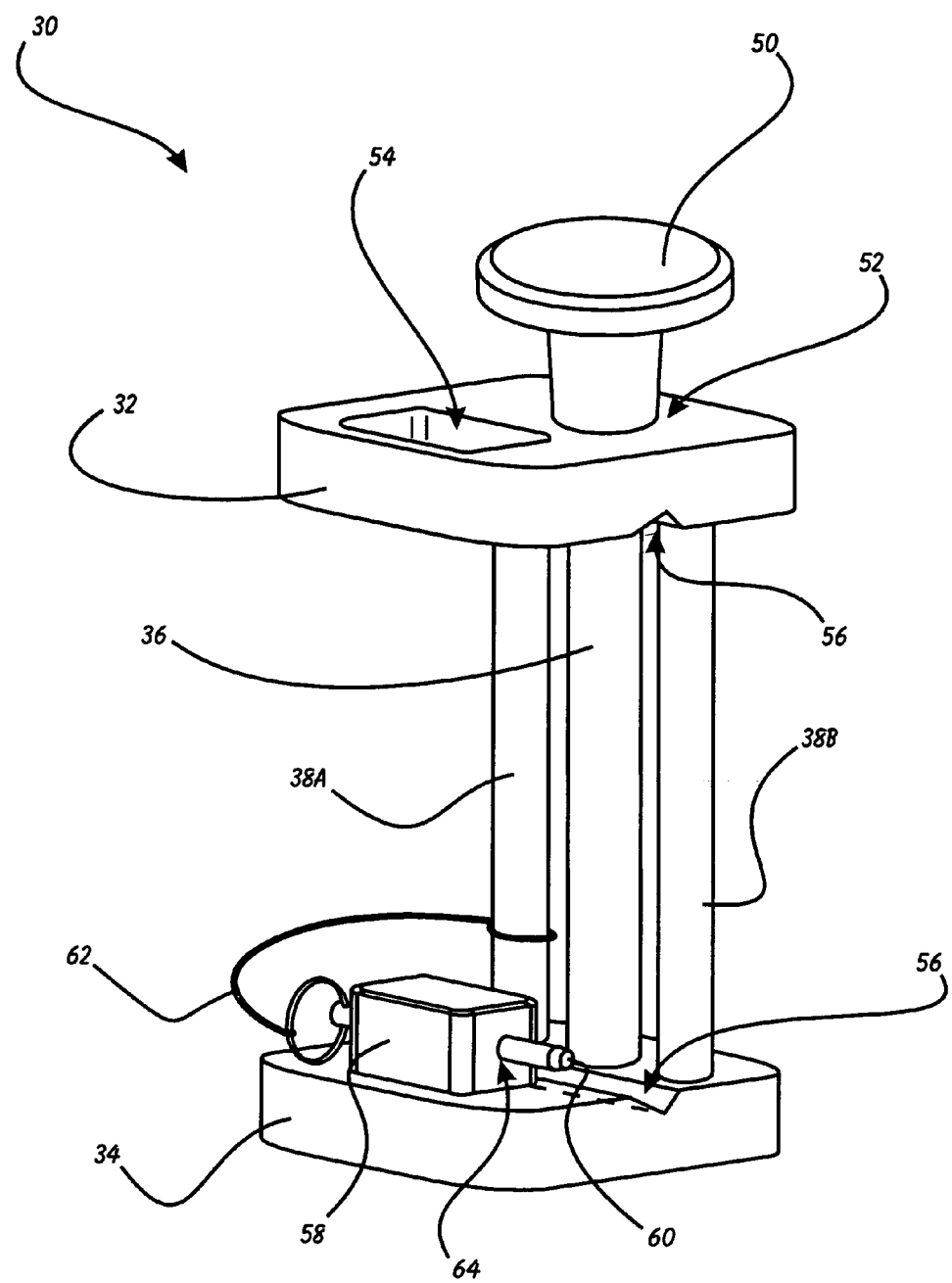
FIG. 2 is a perspective view of a preferred embodiment of the gurney clamp of the present invention.

FIG. 2 is a perspective view of a preferred embodiment of the gurney clamp 30 of the present invention. The clamp 30 is specifically designed to securely clamp onto the rails of a conventional portable gurney. With minor adaptation, the clamp 30 could also attach to a typical hospital bed. Its purpose is to provide a location for the stand 10 to be attached to the gurney or bed.

The clamp 30 by an upper jaw member 32 and a lower jaw member 34. The two jaw members 32 and 34 are interconnected by structural members that provide the motion and clamping action exhibited by the clamp 30. The central of these members are the female threaded post 36 and the male threaded post (see FIG. 3) which threaded engages the internal threaded bore formed in the female threaded post. The male threaded post (see FIG. 3) is interconnected to the knob 50 where the male threaded post (see FIG. 3) extends through an aperture 52 formed in the upper jaw 32. Since they are interconnected, turning the knob 50 will cause the male threaded post (see FIG. 3) to also turn, thereby causing the threads of the male post (see FIG. 3) to engage the threads of the female threaded post 36 to create longitudinal force and motion along the axis of the male and female threaded posts.

Straddling the threaded male and female posts are first and second guide tubes and posts. To the left side in this depiction, a first guide post (see FIG. 3) is housed within a first guide tube 38A. The first guide post (see FIG. 3) is attached to the upper jaw member 32, and the first guide tube 38A is attached to the lower jaw member 34. The inner bore formed in the tube 38A is configured to cooperate with the outer diameter of the first guide post (see FIG. 3) so that the post will slide within the tube 38A, while still providing enough structural integrity to keep the upper jaw member 32 aligned with the lower jaw member 34 as the clamp 30 is operated.

Similarly, there is a second guide post (see FIG. 3) attached to the upper jaw member 32 and housed within the second guide tube 38B, which is attached to the lower jaw member 34. The second guide post and tube 38B operate the same as the first guide post and tube.

The upper jaw member 32 has a slot 54 cut through it. The slot 54 has a shape that cooperates with the outer form of the vertical section of the upright arm of the stand (see FIG. 1) such that the bottom end of the vertical section can slide through the slot 54 formed in the upper jaw member 32. There is also a V-groove 56 cut transversely in the bottom surface of the upper jaw member 32. The V-groove 56 on the upper jaw member 32 is aligned with a substantially identical V-groove 56 formed in the lower jaw member 34.

It should be casually obvious that the V-grooves 56 are designed to clamp to the rails of a gurney rail to securely hold the clamp 30 to the gurney. Of course, the V-grooves grooves 56 would be positioned over a pair of vertically-aligned gurney rails, with the user turning the knob 50 until the upper jaw 32 presses down onto the top of an upper gurney rail and the lower jaw 34 presses upwardly on the bottom of a lower gurney rail.

The lower jaw member 34 has an upwardly-extending peg 58 formed on (or attached to) its top surface. The peg 58 is in alignment with the slot 54 formed in the upper jaw member 32. The peg 58 is configured to cooperate with the inner profile of the lowest end of the vertical section of the upright arm of the stand (see FIG. 1) so that the lowest end of the upright arm can be placed over the peg 58. There is a retaining bore 64 cut through the peg 58 for receiving a retaining pin 60 therethrough. The retaining pin 60 and retaining bore 64 are located so that when the lowest end of the upright arm of the stand (see FIG. 1) is place over the peg 58, the bore 64 will align with the pair of apertures formed in the arm so that the pin 60 can be inserted through the apertures in the arm and the bore 64, thereby holding the arm securely to the peg 64.

It should be apparent that the stand will be held securely in the upright position by inserting the vertical section 16 of the upright arm 14 through the slot 54 and then pinning it to the peg 58 with a pin 60 passing through the retaining bore 64 and retaining aperture 25. The clamp 30 can be attached and detached from an external structure (e.g. the gurney rail) whether the stand is attached to the clamp 30 or whether the stand is separate from the clamp 30. If we now turn to FIG. 3, we can see the clamp 30 in its open position.

Figure 3:
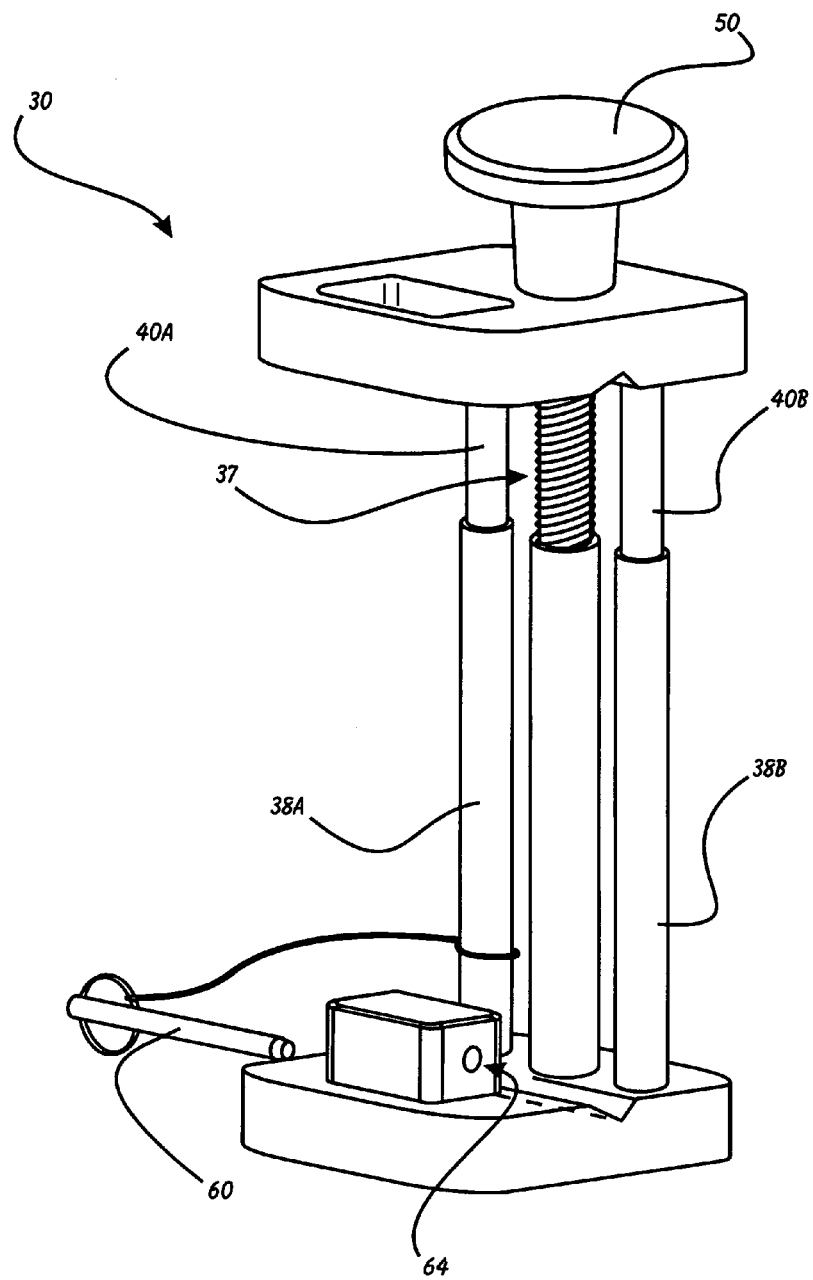
FIG. 3 is another perspective view of the gurney clamp of FIG. 2.

FIG. 3 is another perspective view of the gurney clamp of FIG. 2. Here, in its extended position, the male threaded post 37 can be seen because it is extended beyond the end of the female threaded tube 36. Similarly, the first and second guide posts 40A and 40B can be seen here extending beyond the tops of the first and second guide posts 38A and 38B, respectively.

Many of the parts of the clamp 30 are formed from solid aluminum for lightweight strength. The threaded and guide posts and tubes are most likely formed from steel (likely stainless steel) in order to provide even more durability. Now turning to FIG. 4, we can examine the details of the third and final component of the assembly of the present invention.

Figure 4:
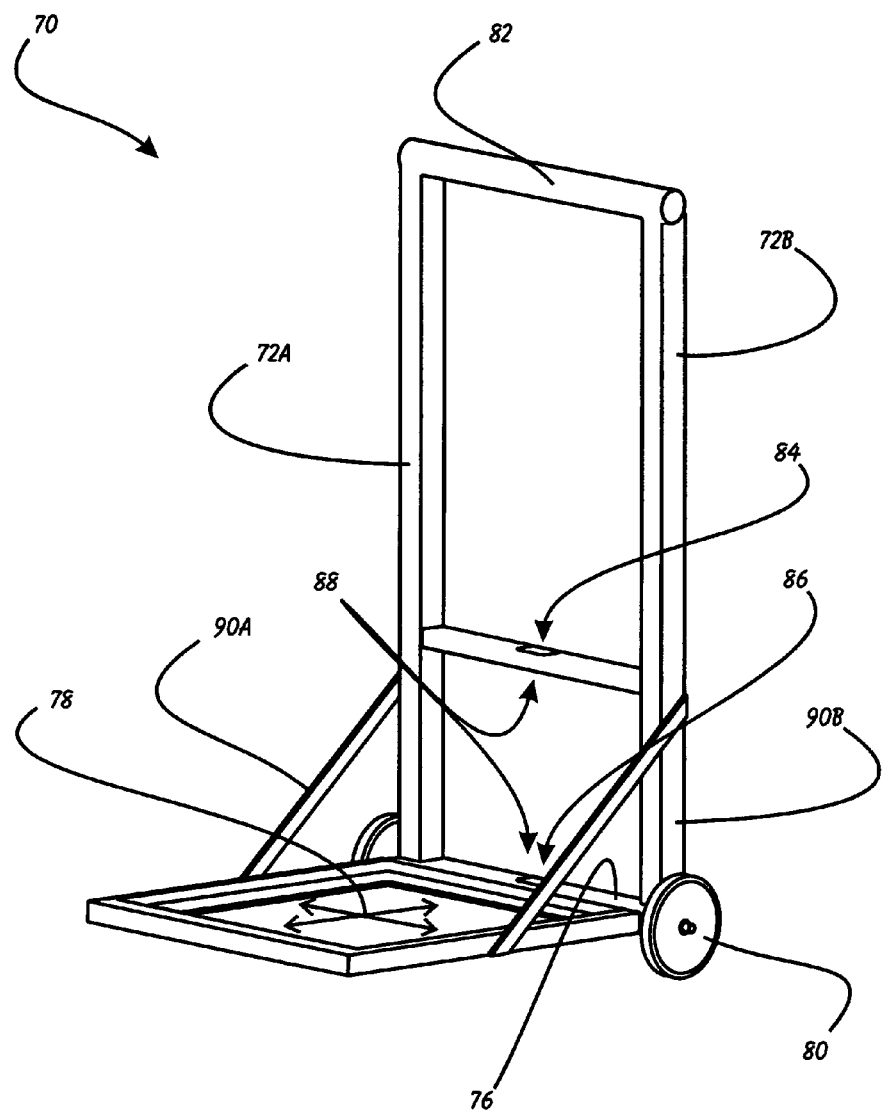
FIG. 4 is a perspective view of a preferred embodiment of the transport cart of the present invention.

FIG. 4 is a perspective view of a preferred embodiment of the transport cart 70 of the present invention. The cart 70 is specifically designed to cooperatively hold the stand of FIG. 1 when the stand is not attached to a bed or gurney. The cart 70 is defined by first and second opposing upright frame members 72A and 72B, respectively. The upright frame members 72A and 72B extend upwardly from a lower platform frame 78, and terminate in the handle 82.

The upright frame members 72A and 72B are interconnected by an upper transverse frame member 74 and a lower transverse frame member 76. The upper transverse frame member 74 has an upper stand slot 84 formed through it. The upper stand slot 84 is essentially identical in dimensions to the slot formed in the upper jaw of the gurney clamp.

There is also a lower stand slot 86 formed in the lower transverse frame member 76. The lower stand slot 86 has the same dimensions as the upper stand slot 84 and is aligned to be in line with it as well. The lower stand slot 84, however, has a closed bottom surface to prevent the stand's lowest end of the upright arm's vertical section from sliding therethrough once inserted into the slots 84 and 86.

Figure 5:
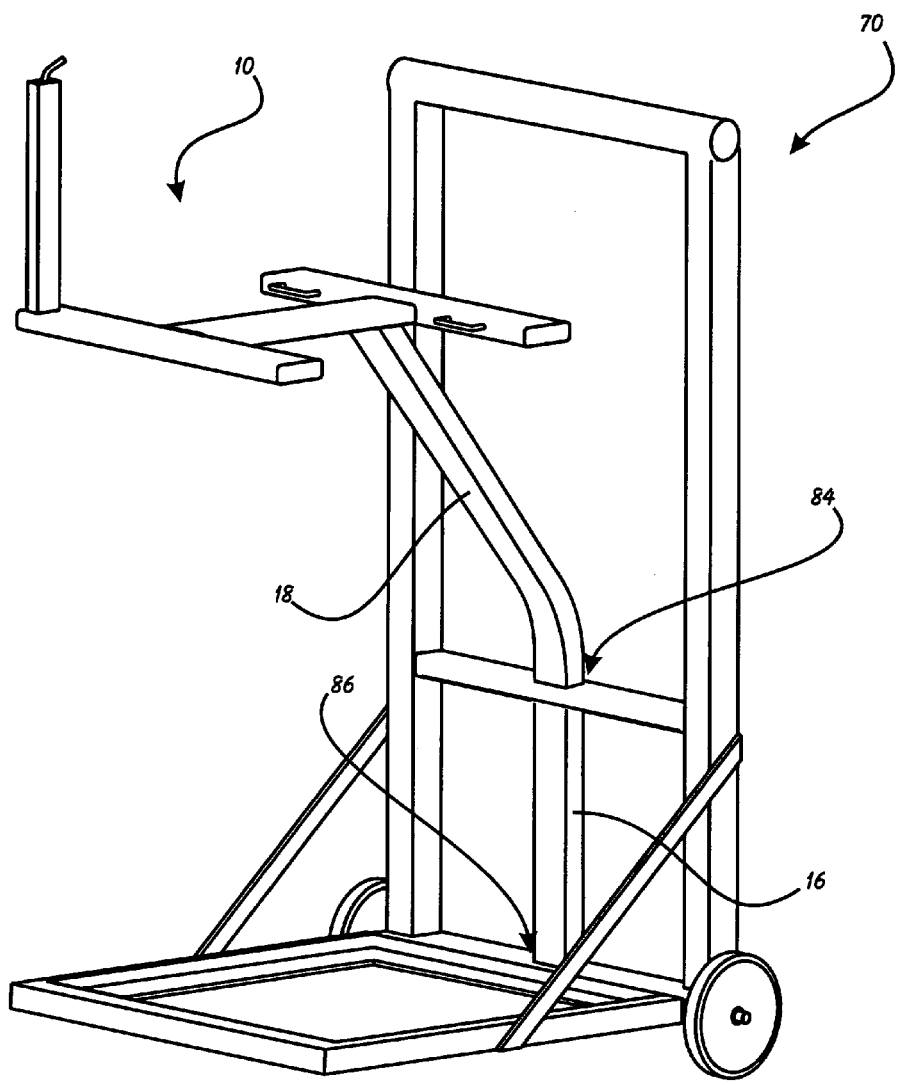
FIG. 5 is a perspective view of the stand of FIG. 1 mounted to the cart of FIG. 4.

There are first and second stiffening struts 90A and 90B interconnecting the lower platform frame 80 with the first and second frame members 72A and 72B. These struts 90A and 90B simply provide additional rigidity and stiffness to the cart's structure. The wheels 80 permit the cart 70 to be tilted and wheeled around when the user wishes to move the cart 70 (and stand/equipment). FIG. 5 shows how the cart and stand work together.

FIG. 5 is a perspective view of the stand 10 of FIG. 1 mounted to the cart 70 of FIG. 4. As shown here, the stand 10 extends conveniently upward and outward from the cart 70. This condensed package can fit easily within an ambulance during transit. The stand 10 can be easily removed from the cart 70 once arriving on-scene. Furthermore, the cart/stand combination can be used as a portable stand for the monitoring equipment.

A securing device may be required in order to secure the cart 70 to the ambulance while the vehicle is in motion. In a typical scenario, the stand 10 having the monitoring equipment attached to it will be clamped to the gurney. The cart 70, however will most likely have additional items on it that the technicians will desire to have on hand while in transit.

Figure 6:
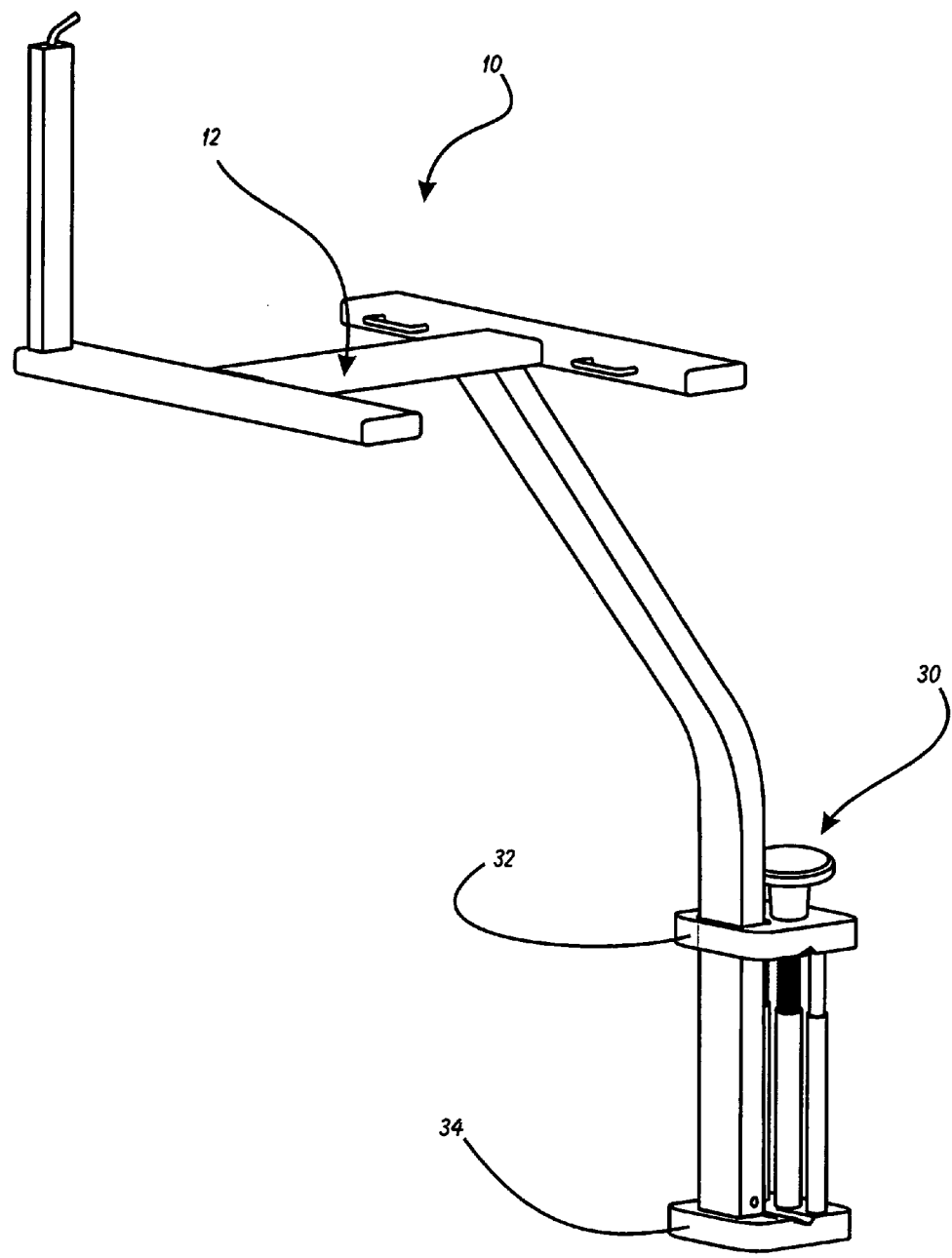
FIG. 6 is a perspective view of the stand of FIG. 1 mounted to the clamp of FIGS. 2 and 3.

The lower platform 78 is designed to allow one or more piece of mobile equipment to be placed there when not in use. This allows the user to remove the stand 10 from the cart 70 without the weight of the piece of equipment on it. FIG. 6 shows how the clamp and stand work together.

FIG. 6 is a perspective view of the stand 10 of FIG. 1 mounted to the clamp 30 of FIGS. 2 and 3. The stand 10, when inserted into the clamp 30 that is attached to a gurney or hospital bed, will be securely held to that gurney or bed. The base 12 will provide a level and secure platform for a piece of portable medical equipment. The gurney can be rolled around without a fear of the equipment being damaged, and without the need for the medical personnel to even worry about moving the equipment to another location.

Although the above-disclosed embodiment was configured to support, transport and store a specific model of monitoring equipment, and to mount to a specific gurney model, the sizes and locations of the necessary coordinating elements of the device can be adjusted in other embodiments in order to accommodate any of the various manufacturers' equipment models.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A gurney clamp, comprising:
    a lower jaw member;
    an upper jaw member juxtaposed in spaced relation over said lower jaw member, and further defined by a slot formed therethrough, and said lower jaw member is further defined by a peg extending upwardly therefrom, slot juxtaposed over said peg;
    a male threaded post engaging an internally threaded female threaded post interconnecting said lower jaw member and said upper jaw member;
    a first guide post slidingly engaging a central bore in a first guide tube, said first guide post and first guide tube interconnecting said lower jaw member and said upper jaw member; and
    a second guide post slidingly engaging a central bore in a second guide tube, said second guide post and second guide tube interconnecting said lower jaw member and said upper jaw member.

2. The clamp of claim 1, wherein said lower jaw member is defined by a top surface, said top surface defined by a V-groove cut transversely therein.

3. The claim of claim 2, wherein said upper jaw member is defined by a bottom surface, said bottom surface defined by a V-groove cut transversely therein vertically aligned with said V-groove cut in said top surface of said lower jaw.

4. The clamp of claim 3, wherein:
    said peg is further defined by a retaining bore formed therein; and
    said clamp is further defined by a pin associated with said clamp, said pin configured to be insertible into said retaining bore.

5. The clamp of claim 4, wherein said male threaded post is rotatably attached to said upper jaw member and further extends upwardly through an aperture formed in said upper jaw member to terminate in a knob on a top side of said upper jaw member, whereby rotating said knob causes said male threaded post to rotate.

6. The claim of claim 5, wherein said first guide tube and first guide post and said second guide tube and second guide post are in spaced relation and said male threaded post and said female threaded tube bisect said space between said first guide tube and first guide post and said second guide tube and said second guide post.

7. A combination, comprising:
    a gurney clamp, comprising:
        a lower jaw member;
        an upper jaw member juxtaposed in spaced relation over said lower jaw member, and further defined by a slot formed therethrough, and said lower jaw member is further defined by a peg extending upwardly therefrom, slot juxtaposed over said peg;
        a male threaded post engaging an internally threaded female threaded post interconnecting said lower jaw member and said upper jaw member;
        a first guide post slidingly engaging a central bore in a first guide tube, said first guide post and first guide tube interconnecting said lower jaw member and said upper jaw member; and
        a second guide post slidingly engaging a central bore in a second guide tube, said second guide post and second guide tube interconnecting said lower jaw member and said upper jaw member; and
    a stand detachably attachable to said gurney clamp, said stand defined by an upright arm that is insertible into a slot formed in said clamp.

8. The combination of claim 7, wherein:
    said upright arm is defined by a hollow distal end that is insertible through said slot and into which said peg is insertible.

9. The combination of claim 8, wherein:
    said upright arm is defined by a vertical section commencing at said distal end and transitioning into an angled section opposite said distal end and terminating in a base end; and
    said stand is further defined by a base extending from said base end of said upright arm.

10. The combination of claim 9, wherein said stand is further defined by a cord strut extending upwardly from said base.

* * * * *